US009965366B2

(12) United States Patent
Fu et al.

(10) Patent No.: US 9,965,366 B2
(45) Date of Patent: *May 8, 2018

(54) ASSIGNING NETWORK DEVICE SUBNETS TO PERFORM NETWORK ACTIVITIES USING NETWORK DEVICE INFORMATION

(71) Applicant: Aerohive Networks, Inc., Milpitas, CA (US)

(72) Inventors: Long Fu, Saratoga, CA (US); Dalun Bao, San Jose, CA (US); Weimin Du, San Jose, CA (US); Jie Zhang, Hangzhou (CN)

(73) Assignee: Aerohive Networks, Inc., Milpitas, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/460,473

(22) Filed: Mar. 16, 2017

(65) Prior Publication Data
US 2017/0185496 A1  Jun. 29, 2017

Related U.S. Application Data

(63) Continuation of application No. 14/102,425, filed on Dec. 10, 2013, now Pat. No. 9,690,676.

(60) Provisional application No. 61/801,578, filed on Mar. 15, 2013.

(51) Int. Cl.
*G06F 11/20* (2006.01)
*H04L 12/24* (2006.01)

(52) U.S. Cl.
CPC ...... *G06F 11/2028* (2013.01); *G06F 11/2038* (2013.01); *G06F 11/2048* (2013.01); *H04L 41/0806* (2013.01)

(58) Field of Classification Search
CPC .... G06F 11/0712; G06F 11/20; G06F 11/202; G06F 11/2023; G06F 11/2025; G06F 11/2033; G06F 11/2005; G06F 11/2007; G06F 11/2028; G06F 11/2038; G06F 11/2048; H04L 41/5054; H04L 41/0668
See application file for complete search history.

(56) References Cited

U.S. PATENT DOCUMENTS 7,057,566 B2  6/2006  Theobold
7,085,224 B1  8/2006  Oran
7,164,667 B2  1/2007  Rayment et al.
(Continued)

OTHER PUBLICATIONS

Cooperative Control Wireless LAN Architecture. 2012. Aerohive Networks, Inc.*

(Continued)

*Primary Examiner* — Paul Contino
(74) *Attorney, Agent, or Firm* — Sheppard, Mullin, Richter & Hampton LLP

(57) ABSTRACT

Techniques and systems for performing a network activity within a network. The technique includes assigning one or a plurality of network devices subnets with network devices for performing network activities. Network devices within the assigned network device subnets can be assigned to act as a primary network device and a backup network device. The primary network device can perform the network activity. The backup network devices can monitor the primary network device and continue performing the network activities if the primary network device fails or is rogue.

17 Claims, 5 Drawing Sheets

(56) References Cited

U.S. PATENT DOCUMENTS

| | | |
|---|---|---|
| 7,181,530 B1 | 2/2007 | Halasz et al. |
| 7,251,238 B2 | 7/2007 | Joshi et al. |
| 7,409,588 B2 | 8/2008 | Yako et al. |
| 7,681,230 B2 | 3/2010 | O'Brien |
| 8,140,888 B1 | 3/2012 | Dhingra et al. |
| 8,174,966 B2 | 5/2012 | Taniguchi et al. |
| 8,321,793 B1 | 11/2012 | Cotter et al. |
| 8,484,353 B1 | 7/2013 | Johnson et al. |
| 8,560,646 B1 | 10/2013 | Sivasubramanian et al. |
| 8,869,235 B2 | 10/2014 | Qureshi et al. |
| 8,893,255 B1 | 11/2014 | Martini |
| 9,032,506 B2 | 5/2015 | Parla et al. |
| 9,152,782 B2 | 10/2015 | Lin et al. |
| 9,319,272 B1 | 4/2016 | Brandwine et al. |
| 2002/0129146 A1 | 9/2002 | Aronoff et al. |
| 2003/0126240 A1 | 7/2003 | Vosseler |
| 2003/0208572 A1 | 11/2003 | Shah et al. |
| 2004/0003285 A1* | 1/2004 | Whelan ............... H04L 63/1408 726/23 |
| 2004/0236666 A1 | 11/2004 | Clark et al. |
| 2005/0055570 A1 | 3/2005 | Kwan et al. |
| 2005/0086255 A1 | 4/2005 | Schran et al. |
| 2006/0026289 A1 | 2/2006 | Lyndersay et al. |
| 2006/0179475 A1 | 8/2006 | Zhang et al. |
| 2007/0078663 A1 | 4/2007 | Grace |
| 2007/0140191 A1 | 6/2007 | Kojima |
| 2007/0150603 A1 | 6/2007 | Crull et al. |
| 2007/0198713 A1 | 8/2007 | Tsao et al. |
| 2008/0077791 A1 | 3/2008 | Lund et al. |
| 2008/0126845 A1 | 5/2008 | Luo et al. |
| 2008/0178182 A1* | 7/2008 | Yamashima ........ G06F 11/1658 718/102 |
| 2008/0244579 A1 | 10/2008 | Muller |
| 2009/0019182 A1 | 1/2009 | Riise et al. |
| 2009/0059874 A1 | 3/2009 | Carter |
| 2009/0327484 A1 | 12/2009 | Chen et al. |
| 2010/0002700 A1 | 1/2010 | Simpson, Jr. |
| 2010/0095359 A1 | 4/2010 | Gordon |
| 2010/0112540 A1 | 5/2010 | Gross et al. |
| 2010/0138899 A1 | 6/2010 | Yamamoto et al. |
| 2010/0142535 A1* | 6/2010 | Swainston .......... H04L 12/2809 370/395.3 |
| 2010/0257399 A1 | 10/2010 | Brown et al. |
| 2010/0287263 A1 | 11/2010 | Liu et al. |
| 2010/0325259 A1 | 12/2010 | Schuler |
| 2011/0040867 A1 | 2/2011 | Kalbag |
| 2011/0067084 A1 | 3/2011 | Byun et al. |
| 2011/0072507 A1 | 3/2011 | Johnston, II et al. |
| 2011/0148743 A1 | 6/2011 | Kuo et al. |
| 2012/0144464 A1 | 6/2012 | Fakhrai et al. |
| 2012/0151248 A1* | 6/2012 | Bower, III ............... G06F 1/30 714/4.11 |
| 2012/0159531 A1 | 6/2012 | O'Callaghan |
| 2012/0192161 A1 | 7/2012 | Pistoia et al. |
| 2012/0303999 A1* | 11/2012 | Calder ............... G06F 11/1471 714/6.3 |
| 2013/0132763 A1 | 5/2013 | Agarwal et al. |
| 2013/0254831 A1 | 9/2013 | Roach et al. |
| 2013/0254889 A1 | 9/2013 | Stuntebeck |
| 2014/0031075 A1* | 1/2014 | Ramiah ................. H04W 48/18 455/524 |
| 2014/0092884 A1 | 4/2014 | Murphy et al. |
| 2014/0101439 A1 | 4/2014 | Pettigrew et al. |
| 2014/0122674 A1* | 5/2014 | Gray .................. H04L 41/0846 709/222 |
| 2014/0156841 A1 | 6/2014 | Fu et al. |
| 2014/0177639 A1 | 6/2014 | Vershkov et al. |
| 2014/0196129 A1 | 7/2014 | Amin |
| 2014/0211308 A1 | 7/2014 | Shin |
| 2014/0258231 A1 | 9/2014 | Birk et al. |
| 2014/0280967 A1 | 9/2014 | Bao et al. |
| 2014/0281672 A1 | 9/2014 | Fu et al. |
| 2014/0282902 A1 | 9/2014 | Zou et al. |
| 2014/0282916 A1 | 9/2014 | Gast |
| 2014/0304808 A1 | 10/2014 | Martini |
| 2014/0330944 A1 | 11/2014 | Dabbiere et al. |
| 2014/0351370 A1 | 11/2014 | Ashley et al. |
| 2015/0052587 A1 | 2/2015 | O'Neill et al. |
| 2015/0324595 A1 | 11/2015 | Strand et al. |
| 2016/0029155 A1 | 1/2016 | Kerr et al. |
| 2016/0112415 A1 | 4/2016 | Park et al. |
| 2016/0182471 A1 | 6/2016 | Wilson et al. |

OTHER PUBLICATIONS

Chen, Minder et al., "Providing Web Services to Mobile Users: The Architecture Design of an m-Service Portal," International Journal of Mobile Communications, vol. 3, No. 1, pp. 1-18, May 2005.

Chung, Sean et al., "2TAC: Distributed Access Control Architecture for 'Bring Your Own Device' Security," 2012 ASE/IEEE International Conference on BioMedical Computing (BioMedCom), pp. 123-126, Dec. 2012.

Cisco Systems, Inc., "Cisco TrustSec™ 2.0: Design and Implementation Guide," Document Version 2.0, Nov. 29, 2011.

Cisco Systems, Inc., "TrustSec How-To Guide: On-boarding and Provisioning," Document Version 3.0, Aug. 27, 2012.

Clausen, T., et al., "Optimized Link State Routing Protocol (OLSR)," Network Working Group, pp. 1-71, Oct. 2003.

Kindberg, Tim et al., "People, Places, Things: Web Presence for the Real World," Mobile Networks and Applications, vol. 7, No. 5, pp. 365-376, Oct. 2002.

Korpipaa, Panu et al., "Managing Context Information in Mobile Devices," IEEE Pervasive Computing, vol. 2., No. 3, pp. 42-51, Jul. 2003.

Perkins, C., et al., "Ad hoc On-Demand Distance Vector (AODV) Routing," Network Working Group, pp. 1-35, Oct. 2003.

* cited by examiner

ASSIGNING NETWORK DEVICE SUBNETS TO PERFORM NETWORK ACTIVITIES USING NETWORK DEVICE INFORMATION

CROSS-REFERENCE TO RELATED APPLICATIONS

This application is a continuation application of U.S. patent application Ser. No. 14/102,425, filed Dec. 10, 2013, which claims priority to U.S. Provisional Patent Application No. 61/801,578, filed Mar. 15, 2013, which are hereby incorporated by reference herein.

BACKGROUND

An area of ongoing research and development is improving the failure resistant of a network. Various network systems have been developed that improve backup devices to ensure that a network can continue to operate and function in the event that a device within the network fails. Specifically, one solution that has been developed is to have a duplicate of every device in the network. The duplicate device can continue to perform the function of a device in a network in case a device fails.

Another area of ongoing research and development is to development networks that utilize fewer resources to perform the same functions as other networks therefore, costing less to create and maintain. One solution is to create distributed networks, whereby network activities, that combine to form a task or method performed over the network or implemented in the network, are performed by different devices or systems within the network. However, in distributed networks, as network activities are performed by multiple different devices in the network to perform a task or implement a method into the network, it is difficult to create a failure resistant network system. For example, if one of the devices or systems in the distributed network performing one of the network activities that is part of the task or the implemented method fails, then the task is not performed or the method is not implemented. There therefore exists a need for selecting the appropriate devices or systems in a network to perform a network activity in a failure resistant distributed network.

The foregoing examples of the related art are intended to be illustrative and not exclusive. Other limitations of the relevant art will become apparent to those of skill in the art upon a reading of the specification and a study of the drawings.

SUMMARY

The following implementations and aspects thereof are described and illustrated in conjunction with systems, tools, and methods that are meant to be exemplary and illustrative, not necessarily limiting in scope. In various implementations, one or more of the above-described problems have been addressed, while other implementations are directed to other improvements.

Techniques and systems for performing network activities in a network. The technique can include determining network activities that need to be performed. The network activities can be determined from a received request to perform a task or service through the network or implement a method into the network. The technique can also include receiving network device information about network devices in one or more network device subnets. The network device information can include resource information and identification information of the network devices. The network device information can also include region and sub-region information of the network devices. The technique can also include assigning network device subnets that include network devices to perform the network activities. The network device subnets can be assigned based on the network device information and the network activities.

The techniques can also include assigning a first network device in the assigned network device subnets to be a primary network device. The technique can also include assigning a second network device in the assigned network device subnets to be a backup network device. The primary network device and the backup network device can be assigned based on the network device information and the network activities.

The primary network device can perform the network activities. The performing of the network activities by the primary network device can be monitored to determine whether or not the primary network device has failed or is rogue. If it is determined that the primary network device has failed or is rogue, the backup network device can resume performing the network activities. The primary network device can send an execution log to the backup network device so that the backup network device can resume performing the network activity at the point within the steps of performing the network activity where the primary network device stopped. If the primary network device is repaired and becomes operational or is no longer rogue, the primary network device can take over the performing of the network activities from the backup network device. Alternatively, if the primary network device is repaired and becomes operational or is no longer rogue, the backup network device can continue to perform the network activities while the primary network device monitors the backup network device.

These and other advantages will become apparent to those skilled in the relevant art upon a reading of the following descriptions and a study of the several examples of the drawings.

DETAILED DESCRIPTION OF THE INVENTION

Figure 1:
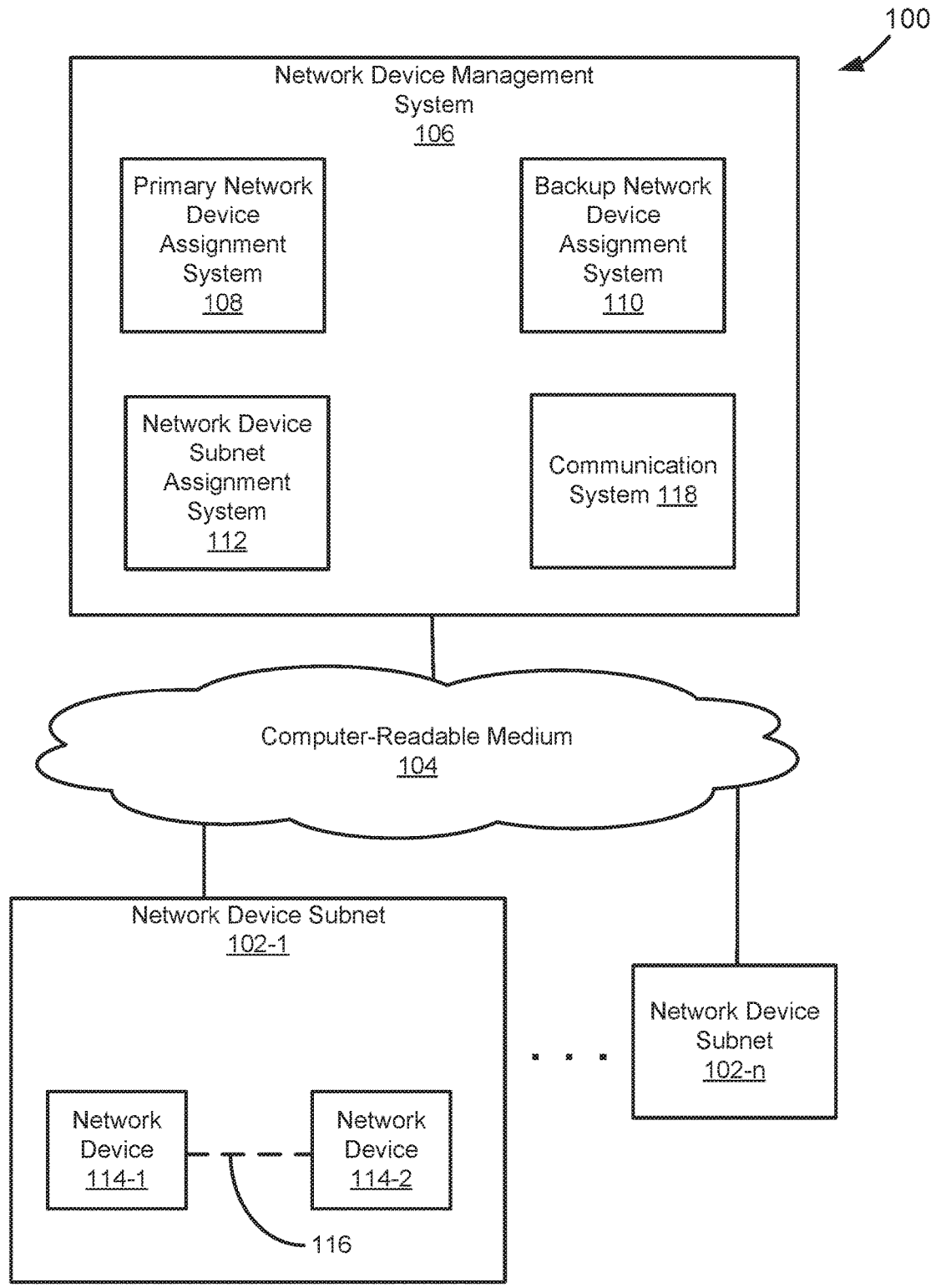
FIG. 1 depicts a diagram of an example of a system configured to assign a primary network device and a network backup device to perform a service.

FIG. 1 depicts a diagram 100 of an example of a system configured to assign a primary network device and a backup network device to perform a service. The system includes network device subnets 102-1 . . . 102-*n*, a computer-readable medium 104, and a network device management system 106. As used in this paper, a system can be implemented as an engine or a plurality of engines.

The network device subnets 102-1 . . . 102-*n* include network devices 114-1 and 114-2. Each network device subnet 102-1 . . . 102-*n* can include a plurality of network devices 114-1 and 114-2, however, for purposes of illustration only two are shown. The network devices 114-1 and 114-2 can be used to form a distributed network, whereby different functions are performed on specific network devices 114-1 and 114-2 that in combination can perform a task or service over the network or implement a method into the network. A network device, as is used in this paper, can be an applicable device used in connecting a client device to a network. For example, a network device can be a virtual private network (hereinafter referred to as "VPN") gateway, a router, an access point (hereinafter referred to as "AP"), a switch, a firewall, a controller, or some other applicable device. The network devices 114-1 and 114-2 can be integrated as part of a router or switch subsystem or as stand-alone devices coupled to upstream router or packet-switching devices or subsystems. The network devices 114-1 and 114-2 can be coupled to client devices through either a wireless or a wired medium. The client devices can include a client wireless device, such as a laptop computer or a smart phone. The client devices can also include a repeater or a plurality of linked repeaters. Therefore, the client devices can be comprised of a plurality of repeaters and a client wireless device coupled together as a chain.

The wireless connection may or may not be IEEE 802.11-compatible. In this paper, 802.11 standards terminology is used by way of relatively well-understood example to discuss implementations that include wireless techniques that connect stations through a wireless medium. A station, as used in this paper, may be referred to as a network device with a media access control (MAC) address and a physical layer (PHY) interface to a wireless medium that complies with the IEEE 802.11 standard. Thus, for example, edge devices and network with which the edge devices associate can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference.

As used in this paper, a system is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative implementations, a station may comply with a different standard than Wi-Fi or IEEE 802.11 and may be referred to as something other than a "station," and may have different interfaces to a wireless or other medium.

IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

Network devices 114-1 and 114-2 can be grouped into network device subnets 102-1 . . . 102-*n* based upon the regions or subregions of the specific network devices 114-1 and 114-2. Specifically, the network device subnets 102-1 . . . 102-*n* can be regionally unique in including network devices 114-1 and 114-2 within certain regions or subregions. The regions or subregions of the network can be defined based upon geography, an enterprise network or a combination of both geography and an enterprise network. Specifically, the region can be defined based upon geography to include the network devices either associated with or located within a geographical area or location, such as a city or a building within a city. Similarly, a subregion can be defined to include network devices located in or associated with a geographical area or location within the geographical area or location used to define the region. For example, the region can be defined to include network devices located in or associated with a state, while the subregion can be defined to include all of the network devices located in or associated with a city in the state that defines the region. The region can also be defined based upon an enterprise to include the network devices associated with or are used in an enterprise network. The region can also be defined based upon a combination of both geography and an enterprise to include the network devices either associated with or located within a geographical location or area within an enterprise network. For example, the region can include the network devices associated with or located within a specific office site of the enterprise.

The regions or subregions of the network devices can not only be defined according to the previously described classifications but also can be defined based upon the number of network devices in or are associated with the region. The region can be defined to include only basic service set (BSS). A BSS includes one network device and all of the stations or other devices (i.e. repeaters) coupled to the network device. The BSS can be identified by a unique basic service set identification (BSSID). The BSSID can be the MAC address of the network device in the BSS. The region can also be defined to include an extended service set (ESS) that comprises plurality BSSs. The plurality of BSSs can be interconnected so that stations or devices are connected to multiple network devices within the ESS. The ESS can be identified by a unique extended service set identification (ESSID). The ESSID can be the MAC addresses of the network devices in the ESS.

The network device subnets 102-1 . . . 102-*n* are coupled to the network device management system 106 through computer readable medium 104. The network device management system includes a primary network device assignment system 108, a backup network device assignment system 110, a network device subnet assignment system 112 and a communication system.

The computer-readable medium 104 is intended to represent a variety of potentially applicable technologies. For example, the computer-readable medium 104 can be used to form a network or part of a network. Where two components are co-located on a device, the computer-readable medium 104 can include a bus or other data conduit or plane. Where a first component is co-located on one device and a second component is located on a different device, the computer-readable medium 104 can include a wireless or wired back-end network or LAN. The computer-readable medium 104 can also encompass a relevant portion of a WAN or other network, if applicable.

The computer-readable medium 104, the network device management system 106, the primary network device assignment system 108, the backup network device assignment system 110, the network device subnet assignment system 112 and the communication system 118 can be implemented as parts of a computer system or a plurality of computer systems. A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

The systems described throughout this paper, can be compatible with or implemented through one or a plurality of cloud-based computing systems. As used in this paper, a cloud-based computing system is a system that provides virtualized computing resources, software and/or information to client devices. The computing resources, software and/or information can be virtualized by maintaining centralized services and resources that edge devices can access over a communication interface, such as a network. "Cloud" may be a marketing term and for the purposes of this paper can include applicable networks described herein. The cloud-based computing system can involve a subscription for services or use a utility pricing model. Users can access the protocols of the cloud-based computing system through a web browser or other container application located on their client device.

The network device subnet assignment system 112 can function to receive network device information about network devices 114-1 and 114-2. The network device subnet assignment system 112 can receive the network device information from the network device management system 106 or an applicable other system of the network device management system 106. The network device information can be received after a request for network device information is sent to the network devices for which the network device information is desired. The request for network device information can be initiated or sent by the network device management system 106, or an applicable system or engine within the network device management system 106, such as the primary network device assignment system 108, the backup network device assignment system 110 and the network device subnet assignment system 112.

The network device subnet assignment system 112 can receive network device information from a plurality of network devices 114-1 and 114-2 in a specific network device subnet or subnets 102-1 . . . 102-n. The network device subnet assignment system 112 can receive network device information from all of the network devices 114-1 and 114-2 to which the network device subnet assignment system 112 is coupled.

The network device information received by the network device subnet assignment system 112 can include resource information of the network devices 114-1 and 114-2. The resource information can include the amount of available bandwidth, the amount of available memory, the processor speed of the processor or processors in a network device and what other network activities have been assigned to or are being performed by a specific network device. The network device information can also include identification information, such as the MAC address of a specific network device. Additionally, the network device information can also include identification information, such as MAC addresses, of the devices, including client devices, that a specific network device is directly connected to within the network. The network device information can also include the region or subregions of the network devices.

The network device subnet assignment system 112 can also function to assign one or a plurality of network device subnets 102-1 . . . 102-n that include network devices 114-1 and 114-2 to carry out a specific network activity. The network device subnet assignment system 112 can assign one or a plurality of network device subnets 102-1 . . . 102-n based on the type of network activity to be performed and/or the received network device information. Specifically, in one example, the network activity can be of a type that uses a large amount of resources in supporting it. As a result, the network device subnet assignment system 112 can assign network device subnets 102-1 . . . 102-n with network devices 114-1 and 114-2 that have enough available bandwidth to support the network activity.

The network device subnet assignment system 112 can also assign one or a plurality of network device subnets 102-1 . . . 102-n based on either the regions or subregions of the network devices (e.g. 114-1) or both the type of network activity to be performed and the regions or subregions of the network devices in the one or plurality of network device subnets 102-1 . . . 102-n. The regions or subregions of the network devices can be part of the received network device information. The network activity can be specific to certain users within the same region or subregion. For example, the activity can be retrieving information from a marketing database that marketing people in a company use. The marketing people can all be located in the same region, such as a floor of an office building. The network device subnet assignment system 112 can then assign the network activity of retrieving information from the marketing database to the network device subnets 102-1 . . . 102-n that include the network devices on the floor of the office building where all the marketing people are located.

The network device subnet assignment system 112 can assign network device subnets 102-1 . . . 102-n that contain network devices (e.g. 114-1) to perform a specific network activity based upon the receiving of a request to perform a task or service over the network or integrate a method into the network. For example, the network device subnet assignment system 112 can receive a request to stream video to specific users connected to network devices 114-1 and 114-2 within a certain region. In another example, the network device subnet assignment system 112 can receive a request to download and update to an operating system of the network devices 114-1 and 114-2. The service can be unique to an enterprise and integrated in order to customize an enterprise network for the enterprise. For example, the request can be to implement the method of retrieving credit information of a purchaser if their purchaser exceeds a certain amount.

The request to perform a task or service over the network or implement a method into the network can be initially received by the network device management system 106 or an applicable system within the network device management system 106. The network device subnet assignment system 112 can receive the request from the user that created the request through a communication system 118. The network device management system 106 or an applicable system within the network device management system 106 can determine, from the request, one or a plurality of specific network activities that need to be executed by network devices (e.g. 114-1) in order to perform the task or service over the network or integrate the method into the network. The network device subnet assignment system 112 can receive the plurality of specific network activities determined to be needed in order to perform the task or service over the network or integrate a method into the network. The network device subnet assignment system 112 can then assign a network device subnet 102-1 . . . 102-n based on the determined network activities.

The request to perform a task or service over the network or integrate a method into the network can be generated by a user or an administrator. The user or administrator can generate the request through user injection by inputting the task, service or method through the communication system 118 to the network device management system 106 or systems within the network device management system 106. The user can generate the request by selecting the task, service or method from a set of predetermined tasks, services or methods. The tasks, services or methods can be determined from tasks, services or methods performed or implemented on a network similar to the enterprises network. The tasks, services or methods can be determined from tasks, services or methods performed or implemented on a related enterprise's network. The enterprises can be related if they have similar or complimentary business models, goals or products.

The request to perform a task or service over the network or integrate a method into the network can be generated by the network device management system 106 or systems within the network device management system 106 without user or administrator intervention. The network device management system 106 can determine from the operation of the network that it is desirable to perform a task or service over the network or implement a method into the network. Desirable can be defined to include when the performing of a task or service over the network or implementing a method into the network reduces the amount of network resources used. Desirable can be defined to include when performing the task or service over the network or implementing a method into the network increases the ease by which a user can connect to and interact with the network or other users through the network.

The network device subnet assignment system 112 can assign a network device subnet 102-1 . . . 102-n with network devices (e.g. 114-1) to perform specific network activities based on constraints that a user, administrator or network device management system 106 inputs. Specifically, the network device subnet assignment system 112 can be configured to receive constraints either before or after the network device subnet assignment system 112 receives a request to perform a task or service over the network or implement a method into the network. The constraints can include an applicable restriction that a user, administrator or network device management system 106 has about network devices in a specific network device subnet 102-1 . . . 102-*n* carrying out a specific network activity that can be necessary to performing a specific task or service over the network or implementing a method into the network. For example, a user can input a constraint that only network devices in a certain region or subregion be assigned to carry out the specific network activity. As a result, the network device subnet assignment system 112 can use such constraints to assign the network activity to network device subnets that contain network devices within the certain region or subregion input as constraints. The constraints can include instructions not to assign to an explicit network device subnet 102-1 . . . 102-*n*.

The network device management system 106 can also include a primary network device assignment system 108. The primary network device assignment system 108 can function to assign a primary network device (e.g. 114-1) to perform a specific network activity. The primary network device can be in the one or a plurality of network device subnets (e.g. 102-1) that the network device subnet assignment system 112 assigns to perform a specific network activity. In one example, the primary network device is the network device that will carry out and perform the network activity as long as the primary network device is still operational and has not failed.

The primary network device assignment system 108 can receive network device information from the network devices. The network device information can include the same information received by the network device subnet assignment system 112. The network device information can be initially received by the network device management system 106 or an applicable other system within the network device management system 106 and then sent to the primary network device assignment system 108. The network device information can be sent by the network devices (e.g. 114-1) after receiving a request for network device information. The request for network device information can be initiated or sent by the network device management system 106, or an applicable system or engine within the network device management system 106. The request for network device information can be sent to the network devices based on the network device subnets (e.g. 102-1) that the network device subnet assignment system 112 assigns. For example, if the network device subnet assignment system 112 assigns network device subnet 102-1, then the request for network device information can be sent to all of the network devices 114-1 and 114-2 within the specific network device subnet or subnets e.g. 102-1.

The primary network device assignment system 108 can also receive the one or a plurality of specific network activities required to perform the requested task or service or implement the requested method. The plurality of specific network activities can be received from the network device management system 106 or an applicable other system within the network device management system 106. The specific network activities can be determined by the network device management system 106 or an applicable system within the network device management system 106 from the request to perform a task or service or implement a method. The primary network device assignment system 108 can receive either or both the plurality of specific network activities or the request to perform a task or service or implement a method from a user or administrator directly through the communication system 118. In one example, the specific network activity or activities can include downloading of data by the primary network device and then distributing the downloaded data to other network devices. The other network devices can be all of the network devices within the same network device subnet as the primary network device. The data can be distributed to the other network devices over the network created by the network devices if they are interconnected on the network device level. For example, the primary network device can download an operating system update and then distribute it to the other network devices within the network device subnet 102-1.

The primary network device assignment system 108 can assign a primary network device (e.g. 114-1) to perform a network activity based on the same information used by the network device subnet assignment system 112 to assign a network device subnet (e.g. 102-1). The primary network device can be a different network device than the network device assigned as the backup network device. The primary network device assignment system 108 can assign a primary network device (e.g. 114-1) based on the type of network activity to be performed and/or the received network device information. Specifically, in one example, the network activity can be of a type that uses a large amount of resources in supporting it. As a result, the primary network device assignment system 108 can assign a primary network device (e.g. 114-1) that has enough available bandwidth to support the network activity.

The primary network device assignment system 108 can also assign a primary network device (e.g. 114-1) based on either the regions or subregions of a network device or both the type of network activity to be performed and the regions or subregions of a network device. The regions or subregions of the network device can be part of the received network device information. The network activity can be specific to certain users within the same region or subregion. For example, the activity can be retrieving information from a marketing database that marketing people in a company use. The marketing people can all be located in the same region, such as a floor of an office building. The primary network device assignment system 108 can then assign the network activity of retrieving information from the marketing database to a network device on the floor of the office building where all the marketing people are located, to which the marketing people can connect.

The primary network device assignment system 108 can also assign a primary network device (e.g. 114-1) based on network devices that can potentially be assigned to be a backup network device by the backup network device assignment system 110, as will be discussed later. The primary network device assignment system 108 can select a primary network device (e.g. 114-1) only if there is a network device that can act as a backup network device in the same region or subregion or a neighboring region or subregion of the network devices that the primary network device assignment system 108 will assign to act as the primary network device. In determining that a network device can act as a backup network device, the backup network device assignment system 110, as will be discussed later, can use the same methods and criteria that the primary network device assignment system 108 uses to assign a network device to be a primary network device.

The primary network device assignment system 108 can assign a network device (e.g. 114-1) to perform a specific network activity as a primary network device based on constraints that a user, administrator or network device management system 106 inputs. The user or administrator can input the constraints through the communication system 118. The primary network device assignment system 108 can be configured to receive constraints either before or after the network device management system 106 or an applicable other system within the network device management system 106 receives a request to perform a task or service over the network or implement a method into the network. The constraints can include an applicable restriction that a user, administrator or network device management system 106 has about network devices in a specific network device subnet 102-1 . . . 102-*n* being assigned as the primary network device and carrying out a specific network activity that can be necessary to performing a specific task or service over the network or implementing a method into the network. For example, a user can input a constraint that only network devices in a certain region or subregion be assigned to be the primary network device and carry out the specific network activity. As a result, the primary network device assignment system 108 can use such constraints to assign network devices within the certain region or subregion specified in the inputted constraints to act as the primary network device. The constraits can include instructions not to assign an explicit network device (e.g. 114-1) to serve as the primary network device.

The primary network device assignment system 108 can function to send the configurations that the assigned network devices (e.g. 114-1) need to implement in order to carry out the network activity. The primary network device assignment system 108 can also function to send the backup network device information received from the backup network device assignment system 110. Specifically, the primary network device assignment system 108 can receive identification information of the backup network device after the backup network device assignment system 110 assigns a backup network device. The identification information can include the MAC address of the backup network device. The identification information can be used by the primary network device to connect to and communicate with the backup network device.

The network device management system 106 includes a backup network device assignment system 110. The backup network device assignment system 110 can function to assign a backup network device (e.g. 114-1). The backup network device can be in the one or a plurality of network device subnets (e.g. 102-1) that the network device subnet assignment system 112 assigns to perform a specific network activity. In one example, the backup network device is the network device that will back up the primary network device and carry out and perform the network activity if the primary network device becomes inoperative, has failed, or is a rogue network device.

The backup network device assignment system 110 can receive network device information from the network devices. The network device information can include the same information received by the network device subnet assignment system 112. The network device information can be initially received by the network device management system 106 or an applicable other system within the network device management system 106 and then sent to the backup network device assignment system 110. The network device information can be sent by the network devices (e.g. 114-1) after receiving a request for network device information. The request for network device information can be initiated or sent by the network device management system 106, or an applicable system or engine within the network device management system 106. The request for network device information is sent to the network devices based on the network device subnets (e.g. 102-1) that the network device subnet assignment system 112 assigns. For example, if the network device subnet assignment system 112 assigns network device subnet 102-1, then the request for network device information can be sent to all of the network devices 114-1 and 114-2 within the specific network device subnet or subnets e.g. 102-1.

The backup network device assignment system 110 can also receive the one or a plurality of specific network activities required to perform the requested task or service or implement the requested method. The plurality of specific network activities can be received from the network device management system 106 or an applicable other system within the network device management system 106. The specific network activities can be determined by the network device management system 106 or an applicable system within the network device management system 106 from the request to perform a task or service or implement a method. The backup network device assignment system 110 can receive either or both the plurality of specific network activities or the request to perform a task or service or implement a method from a user or administrator directly through the communication system 118.

The backup network device assignment system 110 can assign a backup network device (e.g. 114-1) to perform a network activity in backing up the primary network device based on the same information used by the network device subnet assignment system 112 to assign a subnet (e.g. 102-1). Additionally, the backup network device assignment system 110 can assign a backup network device (e.g. 114-1) based on the type of network activity to be performed and/or the received network device information. Specifically, in one example, the network activity can be of a type that uses a large amount of resources in supporting it. As a result, the backup network device assignment system 108 can assign a backup network device (e.g. 114-1) that has enough available bandwidth to support the network activity.

The backup network device assignment system 110 can also assign a backup network device (e.g. 114-1) based on either the regions or subregions of a network device or both the type of network activity to be performed and the regions or subregions of a network device. The regions or subregions of the network device can be part of the received network device information. The network activity can be specific to certain users within the same region or subregion. For example, the activity can be retrieving information from a marketing database that marketing people in a company use. The marketing people can all be located in the same region, such as a floor of an office building. The backup network device assignment system can then assign the network activity of retrieving information from the marketing database to a network device on the floor of the office building where all the marketing people are located, to which the marketing people can connect.

The backup network device assignment system 110 can also assign a primary network device (e.g. 114-1) based on the network devices that can potentially be assigned to be a primary network device or the network device that has been assigned to be the primary network device. The backup network device assignment system 110 can assign a backup network device in the same region or subregion as the primary network device. The backup network device assignment system 110 can assign a backup network device in the same network device subnet 102-1 . . . 102-*n* as the primary network device.

The backup network device assignment system 110 can assign a network device (e.g. 114-1) to act as the backup network device based on constraints that a user, administrator or the network device management system 106 inputs. The user and administrator can input the constraints through the communication system 118. Specifically, the backup network device assignment system 110 can be configured to receive constraints either before or after the network device management system 106 or an applicable other system within the network device management system 106 receives a request to perform a task or service over the network or implement a method into the network. The constraints can include an applicable restriction that a user, administrator or network device management system 106 has about network devices in a specific network device subnet 102-1 ... 102-n being assigned as the backup network device for carrying out a specific network activity that can be necessary to performing a specific task or service over the network or implementing a method into the network. For example, a user can input a constraint that only network devices in a certain region or subregion can be assigned to be the backup network device and carry out the specific network activity in case the primary network device fails. As a result, the backup network device assignment system 110 can use such constraints to assign network devices within the certain region or subregion specified in the inputted constraints to act as the backup network device. The constraints can include instructions not to assign to an explicit network device (e.g. 114-1).

The backup network device assignment system 110 can function to send the configurations that the backup network device (e.g. 114-2) needs to implement in order to carry out the network activity. The backup network device assignment system 110 can also function to send the network device information received from the primary network device assignment system 108. Specifically, the backup network device assignment system 110 can receive identification information of the primary network device after the primary network device assignment system 108 assigns a primary network device. The identification information can include the MAC address of the primary network device. The identification information can be used by the backup network device to connect to and communicate with the backup network device.

The primary network device and the backup network device can be coupled together so that the backup network device can determine when the primary network device has failed. Upon determining that the primary network device has failed and is no longer operational, the backup network device can continue to perform the network activity at the point in the performance of the network activity where the primary network device stopped. In a specific implementation, only one of either the primary network device and the backup network device perform the network activity at a given time.

If network device 114-1 is assigned as the primary network device and network device 114-2 is assigned as the backup network device, they can be coupled together, illustrated by dashed line connection 116, outside of the network device management system 106. Specifically, network device 114-1 and 114-2 can be coupled together by through the network that the network devices create. In one example, if the network devices create a wireless network, network devices 114-1 and 114-2 can be coupled together through a wireless connection. Through the connection 116, network device 114-2 can monitor network device 114-1 without using resources in the computer-readable medium 104 and the network device management system 106, to determine whether or not network device 114-1 has failed.

Network device 114-1 can be configured to send status messages to network devices 114-2, that network device 114-2 can use to determine whether network device 114-1 has failed so that network device 114-2 has to take over carrying out the network activity that was being performed on network device 114-1. The network device 114-1 can also send an execution log to network device 114-2 so that network device 114-2 can determine where to continue performing steps of the network activity in order to continue carrying out the network activity. The status messages can be sent from network device 114-1 to network device 114-2 over connection 116. Network device 114-1 can be configured to send status messages periodically after a predetermined amount of time. Network device 114-1 can also be configured to send status messages whenever network device 114-2 sends a status message request to network device 114-1. The network device 114-2 can determine that network device 114-1 has failed when the network device 114-1 does not send a status message back to network device 114-2 when a request has been sent to the network device 114-1 or when network device 114-1 is scheduled to send a status message.

Network devices (e.g. 114-2) can also be configured to send a notification of a failed network device to the network device management system 106. For example, network device 114-2, after detecting that network device 114-1 has failed, can send a notification to the network device management system 106 that network device 114-1 has failed. The notification can also include the MAC address of the network device 114-1 that has failed.

After network device 114-1 has failed or become inoperable, the failed network device 114-1 can also be configured to send status messages to network device 114-2 once the failed network device 114-1 becomes operational again and is no longer failing or is no longer rogue. The network device 114-2 can then determine based on the status messages that network device 114-1 is no longer failing and send its execution log to network device 114-1. Network device 114-1 can use the execution log sent by network device 114-2 to determine where in the steps of carrying out the network activity, network device 114-2 stopped and resume carrying out the steps of the network activity. Alternatively, if the network device 114-1 becomes operational again and is no longer failing, or is no longer rogue, network device 114-2 can continue to perform the network activities, while network device 114-1 becomes the backup network device and monitors network device 114-2. If network device 114-2 fails or is rogue, network device 114-1 can take over performing the network activities.

Figure 2:
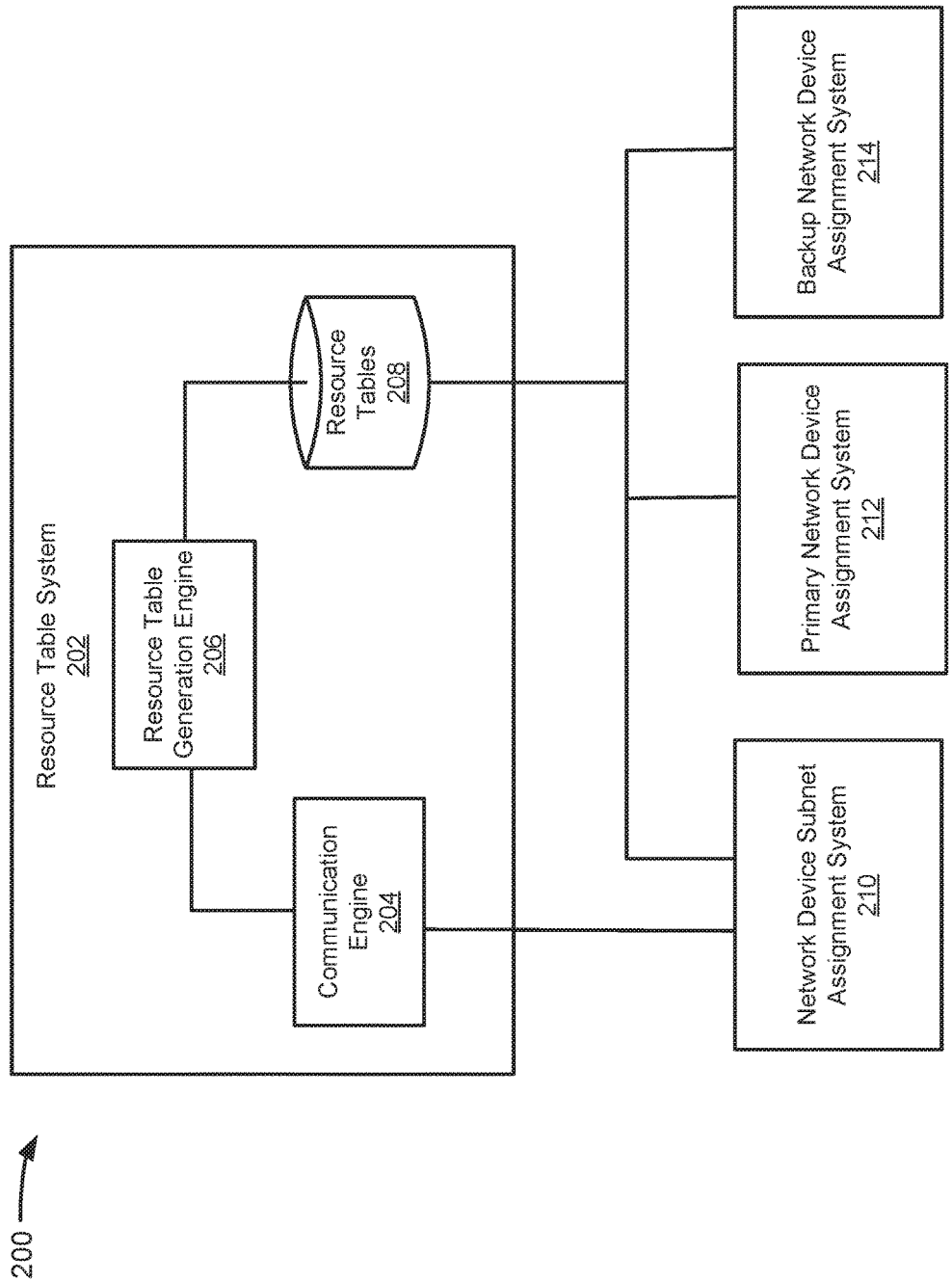
FIG. 2 depicts a diagram of an example of a device management system configured to assign a primary network device and a backup network device to perform a service using a resource table system.

FIG. 2 depicts a diagram 200 of an example of an AP management system configured to assign a primary network device and a backup network device to perform a service using a resource table system. The system shown in FIG. 2 includes a resource table system 202. The resource table system is coupled to a network device subnet assignment system 210, a primary network device assignment system 212 and a backup network device assignment system 214.

The resource table system 202 can include a communication engine 204, a resource table generation engine 206 and a resource tables datastore 208. The datastores can be cloud-based datastores that are compatible with a cloud-based computing system. As used in this paper, datastores are intended to include repositories having an applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at an applicable place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

An engine, as used in this paper, includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor.

One or more of the engines that are part of the systems described in this paper can be cloud-based engines. A cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

The communication engine 204 can function to send requests for network device information to various network devices to which the network device management system is coupled. The communication engine 204 can send requests for network device information to every network device. Specifically, the communication engine 204 can send requests for network device information to every network device if the network device subnet assignment system 210 has not assigned one or a plurality of network device subnets. The communication engine 204 can also be coupled to the network device subnet assignment system 210. The network device subnet assignment system 210 can send the subnet or subnets of network devices that the network device subnet assignment system 210 assigns. The communication engine 204 can use the information about the assigned subnets received from the network device subnet assignment system 210 to selectively send requests for network device information to specific network devices. For example, the communication engine 204 can send requests for network device information to network devices in one of the assigned network device subnets.

The communication engine 204 can also function to receive the network device information from the network devices to which requests for network device information were sent. The network device information can include resource information of the network devices. The resource information can include the amount of available bandwidth, the amount of available memory, the processor speed of the processor or processors in a network device and what other network activities have been assigned to or are being performed by a specific network device. The resource information can also include identification information, such as the MAC address of a specific address. Additionally, the resource information can also include identification information, such as MAC addresses, of the devices that a specific network device is directly connected to within the network. The resource information can also include the region or subregions of the network devices.

The communication engine 204 can be coupled to the resource table generation engine 206. The resource table generation engine can function to use the resource of the network devices to generate a resource table. The resource table generation engine 206 can use applicable select parts or all of the resource information received by the communication engine 204 to generate the resource table. The resource table generation engine 206 can create a resource table for each characteristic resource. For example, the resource table generation engine 206 can create a resource table of the available bandwidth of every network device for which the communication engine 204 receives network device information. The resource table can also include identification information of the network devices for which the resource data are included in the resource table so that a user or system that accesses the resource table can determine the network device. The identification information can include the MAC addresses of the network devices in the resource table.

The resource table generation engine 206 can be coupled to a resources tables datastore 208. The resource tables datastore 208 can function to store the resource tables created by the resource table generation engine 206. The resource tables datastore 208 can store a plurality of resource tables. The resource tables can be stored with timestamps to signify when the resource table was created for the specific network devices. The systems that use the resource tables can determine whether or not a resource table is obsolete from the information contained within the timestamp.

The resource tables datastore 208 is coupled to the network device subnet assignment system 210, the primary network device assignment system 212 and the backup network device assignment system 214. The network device subnet assignment system 210 can use the resource tables to determine a subnet or plurality of subnets of network devices to assign. For example, the network device subnet assignment system 210 can use information from previously created resource tables in the resource tables datastore 208 to determine which subnets contain network devices that previously had a certain amount of available bandwidth. The network device subnet assignment system 210 can then send the subnet or network identification information of the specific network devices in the specific network device subnets that the network device subnet assignment determines from the previously created resource tables to the communication engine 204. The communication engine 204 can then send a request for network device information to the specific network devices identified by the network device subnet assignment system and receive the network device information from the specific network devices so that the resource table system 202 can generate a current resource table for the specific network devices. The network device subnet assignment system 210 can access the current resource table from the resources tables datastore 208 and assign the subnets based upon it.

The primary network device assignment system 212 and the backup network device assignment system 214 can also use the resource tables stored in the resource tables datastore 208 to assign a primary network device and a backup network device. The primary network device assignment system 212 and the backup network device assignment system 214 can either use previously created or currently created resource tables to assign the primary and backup network devices.

Figure 3:
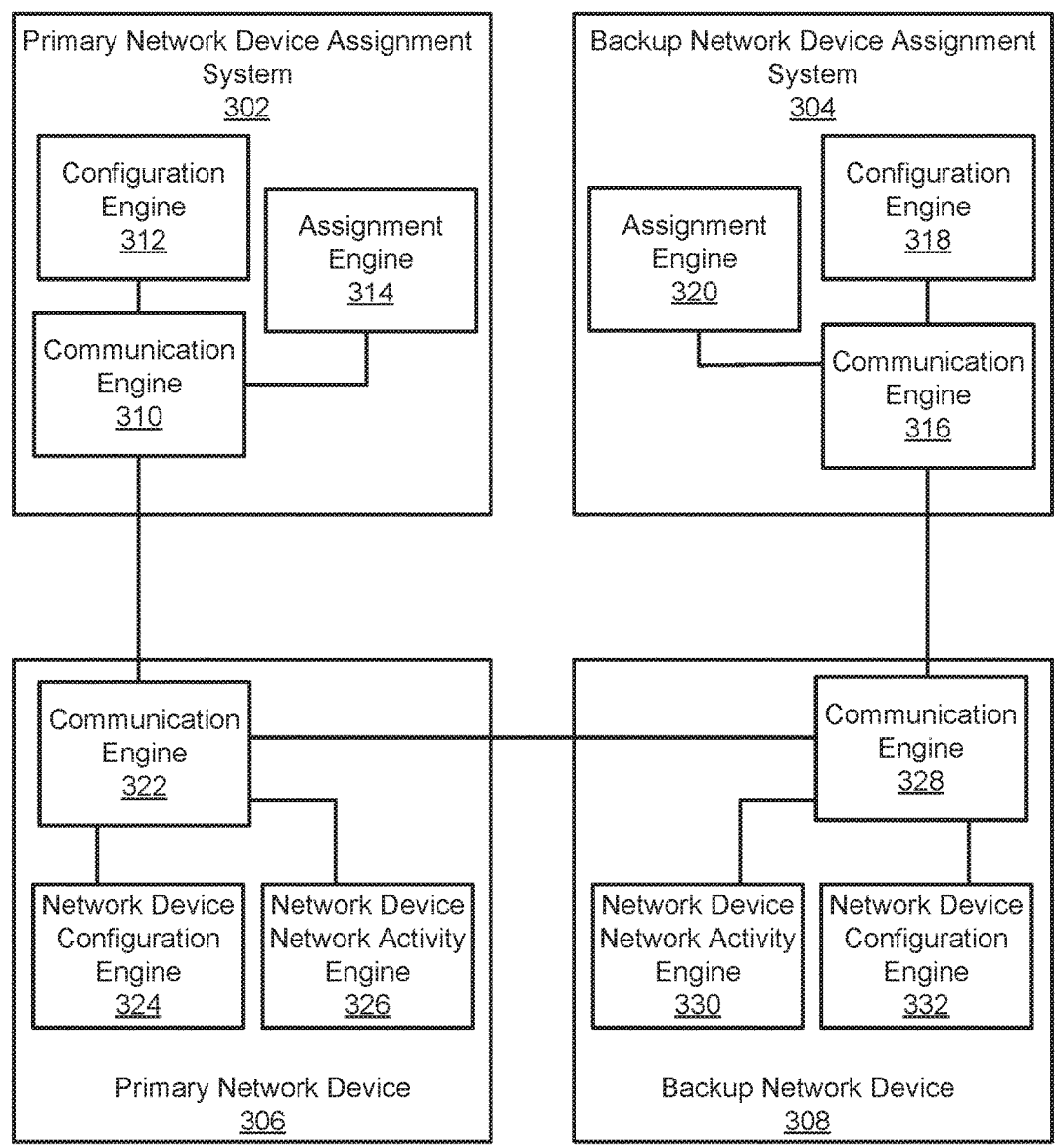
FIG. 3 depicts a diagram of an example of a system configured to allow a primary network device and a backup network device to continue performing a network activity if the primary network device fails or is a rogue device.

FIG. 3 depicts a diagram 300 of a system configured to allow a primary network device and a backup network device to continue performing a network activity if the primary network device fails or is a rogue network device. The system includes a primary network device assignment system 302, a backup network device assignment system 304, a primary network device 306 and a backup network device 308.

The primary network device assignment system 302 and the backup network device assignment system 304 both include communication engines 310 and 316, configuration engines 312 and 318 and assignment engines 314 and 320. The primary network device 306 and the backup network device 308 each include communication engines 322 and 328, network device configuration engines 324 and 332 and network device network activity engines 326 and 330.

The communication engines 310 and 316 of the primary network device assignment system 302 can function to receive network device information. The network device information can include the resource information of specific network devices in specific network device subnets. The communication engines 310 and 316 are coupled to the assignment engines 314 and 320. The assignment engines 314 and 320 can function to determine network devices to assign as the primary network device and the backup network device. The assignment engines 314 and 320 can determine which network devices to assign as the primary network device and the backup network device based on the received network device information. The assignment engines can send identity information of the assigned primary and backup network devices to the communication engines 310 and 316. The communication engines can use the identity information to connect to the communication engines 322 and 328 of the assigned primary network device 306 and backup network device 308.

The communication engines 310 and 316 of the primary network device assignment system 302 and the backup network device assignment system 304 can function to receive network activities that need to be carried out by the primary network device 306 and the backup network device 308. The communication engines 310 and 316 are coupled to the configuration engines 312 and 318 and can send the received network activities to the configuration engines 312 and 318. The communication engines 310 and 316 can also send the received network activities to the assignment engines 314 and 320. The assignment engines can use, along with the network device information, the received network activities to determine which network devices to assign as the primary network device and the backup network device.

The configuration engines 312 and 318 can function to determine the network device configuration that needs to be implemented by the primary network device 306 and the backup network device 308 in order to carry out the received network activity or activities. The configuration engines 312 and 318 can determine the configurations from either or both the received network activities and the received network device information. The configuration engines 312 and 318 can send configuration information to the communication engines 310 and 316. The configuration information can include the steps that the primary network device 306 and the backup network device 308 need to take in order to properly configure themselves to perform the network activity or activities. The communication engines can send the configuration information to the primary network device 306 and the backup network device 308, so that the primary network device 306 and backup network device 308 can be properly configured to carry out the received network activity or activities.

The communication engines 322 and 328 in the primary network device 306 and the backup network device 308 can receive configuration information sent by the primary network device assignment system 302 and the backup network device assignment system. The communications engine 322 and 328 can send the configuration information to network device configuration engines 324 and 332. The network device configuration engines 324 and 332 can use the configuration information to direct the primary network device to perform certain steps and tasks in order to become properly configured to perform the network activity or activities.

The communication engines 322 and 328 can also receive the network activity or activities that need to be performed by the primary network device 306 or the backup network device 308, from the primary network device assignment system 302 and the backup network device assignment system 304. The communication engines 322 and 328 can send the network activity or activities to the network device network activity engines 326 and 330. The network device network activity engines 326 and 330 can implement the received network activity or activities so that either the primary network device 306 or the backup network device 308 are carrying out the network activity or activities. The network device network activity engines 326 and 330 can also create an execution log of the network activity that includes what steps in carrying out the network activity have been performed.

In a specific implementation, the primary network device 306 carries out the network activity until it either fails or is determined to be a rogue network device, at which point the backup network device 308 continues to carry out the network activity. Furthermore, the primary network device 306 can resume carrying out the network activity being performed by the backup network device 308 if the primary network device 306 becomes operational again. The communication engine 322 of the primary network device 306 and the communication engine 328 of the backup network device 308 are coupled together. The communication engines 322 and 328 can be coupled together through the network that the primary network device 306 and the backup network device 308 create. The communication engine 322 of the primary network device 306 can send status messages to the communication engine 328 of the backup network device 308. The backup network device 308 can use such status messages to determine whether or not the primary network device 306 has failed. The communication engines 322 and 328 can also send execution logs of the network activity generated by respective network device network activity engines 326 and 330. The primary network device 306 and the backup network device 308 can use the execution logs of the network activity to resume carrying on the network activity from the point in the steps of carrying out the network activity where the other network devices (306 or 308) stopped.

Figure 4:
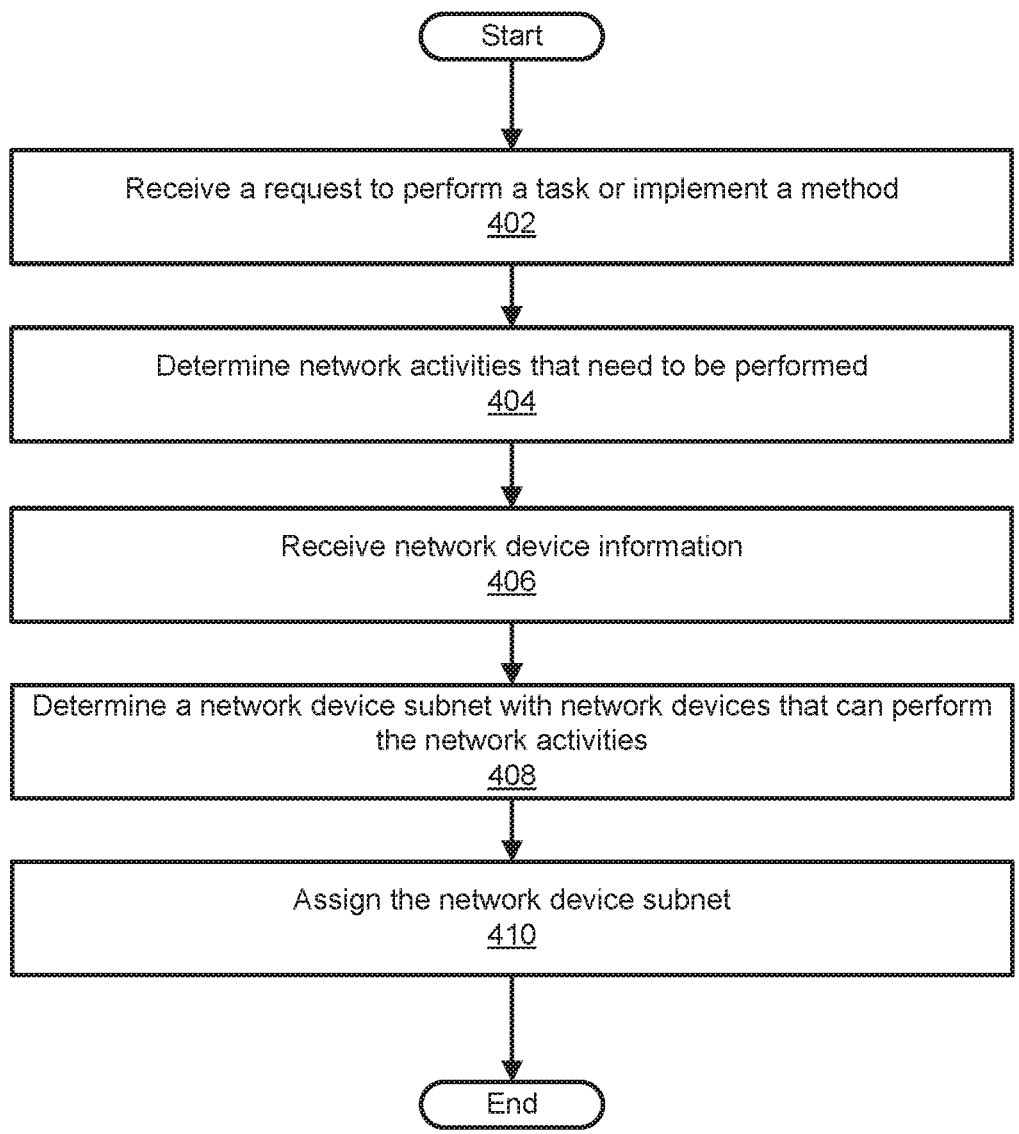
FIG. 4 depicts a flowchart of an example of a method for assigning a subnet of network devices with network devices to perform a network activity or activities.

FIG. 4 depicts a diagram 400 of a flowchart of an example of a method for assigning a subnet of network devices with network devices to perform a network activity or activities. The flowchart begins at module 402 with receiving a request to perform a task over a network or implement a method into a network. At module 404, the flowchart includes determining network activities that need to be carried out in order to perform the task over the network or implement the method into the network that was received at module 402. The network activities, as discussed with respect to FIG. 1, can be determined from the received request to perform a task or implement a method by the network device management system or applicable systems within the network device management system.

At module 406, the flowchart includes receiving network device information 406. The network device information can include resource information, the regions or subregions of the network devices and the identification of the network devices. At module 408, the flowchart includes determining a network device subnet with network devices that can carry out the network activities. The network device subnet can be determined using the network device information received at module 406. The network device subnet can also be determined using the network activities determined at module 404. At module 410, the flowchart includes assigning the network device subnet 410 determined, at module 408, to have network devices that can carry out the network activities determined at module 404.

Figure 5:
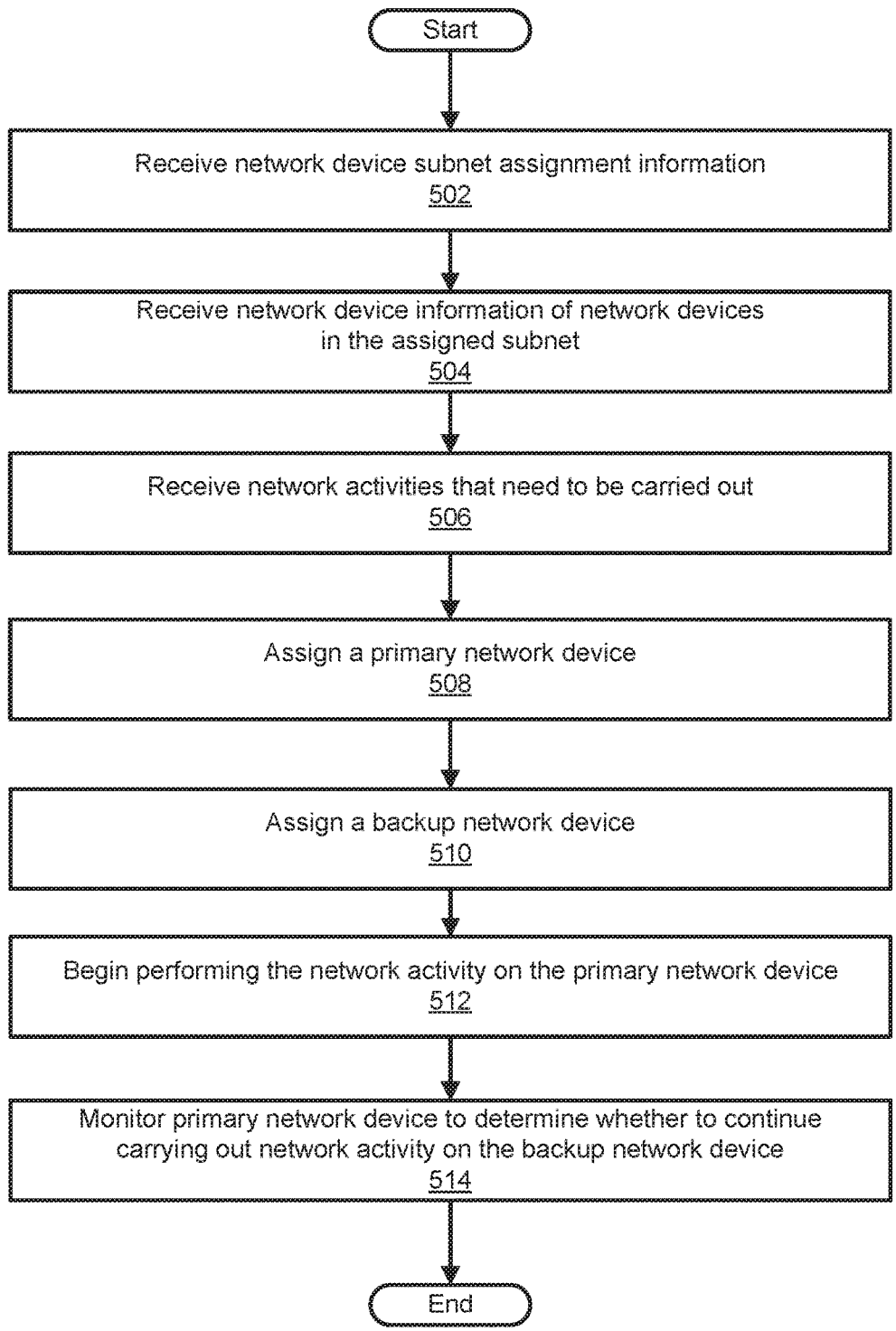
FIG. 5 depicts a flowchart of an example of a method for assigning primary and backup network devices and monitoring the performing of a network activity over the primary network device.

FIG. 5 depicts a diagram 500 of a flowchart of an example of a method for assigning primary and backup network devices and monitoring the performing of a network activity over the primary network device. The flowchart begins at module 502 with receiving network device subnet assignment information. The network device subnet assignment information can include the network device subnet that has been assigned and the identification of the network devices in the assigned network device subnet. The flowchart includes, at module 504, receiving network device information of the network devices within the assigned network device subnet. The network device information can include resource information and identification information of the network devices in the assigned subnet.

The flowchart includes, at module 506, receiving information of the network activities that need to be carried out by either an assigned primary network device or backup network device. The flowchart, at module 508, includes assigning one of the network devices in the assigned subnet as the primary network device. The primary network device can be assigned based on the network device information received at module 504 or the network activities information received at module 506. The flowchart, at module 510, includes assigning one of the network devices in the assigned network device subnet, besides the network device assigned to be the primary network device, as a backup network device. The backup network device can be assigned based on the network device information received at module 504 or the network activities information received at module 506. The flowchart includes, at module 512, beginning of the performing of the network activity on the primary network device. The flowchart also includes, at module 514, the backup network device monitoring the primary network device to determine whether the primary network device has failed or is rogue, and take over the performing of the network activity.

While preferred embodiments of the present inventive apparatus and method have been described, it is to be understood that the embodiments described are illustrative only and that the scope of the embodiments of the present inventive apparatus and method is to be defined solely by the appended claims when accorded a full range of equivalence, many variations and modifications naturally occurring to those of skill in the art from a perusal thereof.

What is claimed:

1. A method comprising:
   determining network activities to be performed for a client device accessing network services through a network;
   assigning, by a network device subnet assignment engine, one or more network device subnets to perform the network activities for the client device accessing the network services through the network based on the network activities to be performed;
   receiving network device information of network devices in the one or more network device subnets including resource information of the network devices in providing network service access through the network;
   assigning a first network device of the network devices in the one or more network device subnets to function as a primary network device in performing the network activities for the client device accessing the network services through the network based on the network device information including the resource information of the network devices in providing network service access through the network, the assigning of the first network device being based on the network device information indicating a region in which the first network device is located;
   assigning a second network device of the network devices in the one or more network device subnets to function as a backup network device in performing the network activities for the client device accessing the network services through the network based on the network device information including the resource information of the network devices in providing network service access through the network, the assigning of the second network device being based on the network device information indicating the second network device is located in the region;
   providing identification information of the second network device to the first network device, the identification information capable of being used by the first network device to route an execution log of the first network device in performing the network activities to the second network device for use by the second network device in resuming performance of the network activities at the second network device.

2. The method of claim 1, wherein the first network device and the second network device are in a same network device subnet of the one or more network device subnets.

3. The method of claim 1, further comprising:
   determining if another network device in a network device subnet associated with the first network device is available to serve as the backup network device to the first network device;
   assigning the first network device of the network devices in the one or more network device subnets to function as the primary network device in performing the network activities for the client device accessing the network services through the network if it is determined that the another network device is available to serve as the backup network device to the first network device, wherein the another network device is the second network device.

4. The method of claim 1, further comprising:
identifying a network device configuration to be implemented by the first network device and the second network device in performing the network activities for the client device accessing the network services through the network based on the network activities;
providing configuration information of the network device configuration to the first network device and the second network device, the configuration information capable of being used by either or both the first network device and the second network device to configure themselves to the network device configuration in performing the network activities for the client device accessing the network services through the network.

5. The method of claim 1, further comprising:
receiving constraints in assigning the one or more network device subnets to performing a plurality of network activities including the network activities;
assigning the one or more network device subnets to perform the network activities for the client device accessing the network services through the network based on the constraints in assigning the one or more network device subnets to performing the plurality of network activities including the network activities.

6. The method of claim 1, wherein the network activities to be performed for the client device accessing the network services through the network are determined based on input injected by a network administrator of the network.

7. The method of claim 1, wherein the network activities are specific to a user of a group of users of the client device and the group of users are associated with a same physical region.

8. The method of claim 1, wherein the resource information includes one or a combination of an amount of available network bandwidth supported by the network devices of the one or more network device subnets, an amount of available memory at the network devices of the one or more network device subnets, processor speeds of processors of the network devices of the one or more network device subnets, and other network activities being performed or assigned to be performed by the network devices of the one or more network device subnets.

9. The method of claim 1, wherein the network devices in the one or more network device subnets form an extended service set identifiable by a unique extended service set identification.

10. A system comprising:
a processor;
memory storing instructions configured to instruct the processor to:
determine network activities to be performed for a client device accessing network services through a network;
assign one or more network device subnets to perform the network activities for the client device accessing the network services through the network based on the network activities to be performed;
receive network device information of network devices in the one or more network device subnets including resource information of the network devices in providing network service access through the network;
assign a first network device of the network devices in the one or more network device subnets to function as a primary network device in performing the network activities for the client device accessing the network services through the network based on the network device information including the resource information of the network devices in providing network service access through the network, the assigning of the first network device being based on the network device information indicating a region in which the first network device is located;
assign a second network device of the network devices in the one or more network device subnets to function as a backup network device in performing the network activities for the client device accessing the network services through the network based on the network device information including the resource information of the network devices in providing network service access through the network, the assigning of the second network device being based on the network device information indicating the second network device is located in the region;
provide identification information of the second network device to the first network device, the identification information capable of being used by the first network device to route an execution log of the first network device in performing the network activities to the second network device for use by the second network device in resuming performance of the network activities at the second network device.

11. The system of claim 10, wherein the first network device and the second network device are in a same network device subnet of the one or more network device subnets.

12. The system of claim 10, wherein the instructions are further configured to instruct the processor to:
determine if another network device in a network device subnet associated with the first network device is available to serve as the backup network device to the first network device;
assign the first network device of the network devices in the one or more network device subnets to function as the primary network device in performing the network activities for the client device accessing the network services through the network if it is determined that the another network device is available to serve as the backup network device to the first network device, wherein the another network device is the second network device.

13. The system of claim 10, wherein the instructions are further configured to instruct the processor to:
identify a network device configuration to be implemented by the first network device and the second network device in performing the network activities for the client device accessing the network services through the network based on the network activities;
provide configuration information of the network device configuration to the first network device and the second network device, the configuration information capable of being used by either or both the first network device and the second network device to configure themselves to the network device configuration in performing the network activities for the client device accessing the network services through the network.

14. The system of claim 10, wherein the instructions are further configured to instruct the processor to:

receive constraints in assigning the one or more network device subnets to performing a plurality of network activities including the network activities;

assign the one or more network device subnets to perform the network activities for the client device accessing the network services through the network based on the constraints in assigning the one or more network device subnets to performing the plurality of network activities including the network activities.

15. The system of claim 10, wherein the instructions are further configured to instruct the processor to determine the network activities to be performed for the client device accessing the network services through the network based on input injected by a network administrator of the network.

16. The system of claim 10, wherein the network activities are specific to a user of a group of users of the client device and the group of users are associated with a same physical region.

17. The system of claim 10, wherein the resource information includes one or a combination of an amount of available network bandwidth supported by the network devices of the one or more network device subnets, an amount of available memory at the network devices of the one or more network device subnets, processor speeds of processors of the network devices of the one or more network device subnets, and other network activities being performed or assigned to be performed by the network devices of the one or more network device subnets.

\* \* \* \* \*